June 12, 1923.
F. M. DOOLEY
BATTERY BOX
Filed April 14, 1922
1,458,280
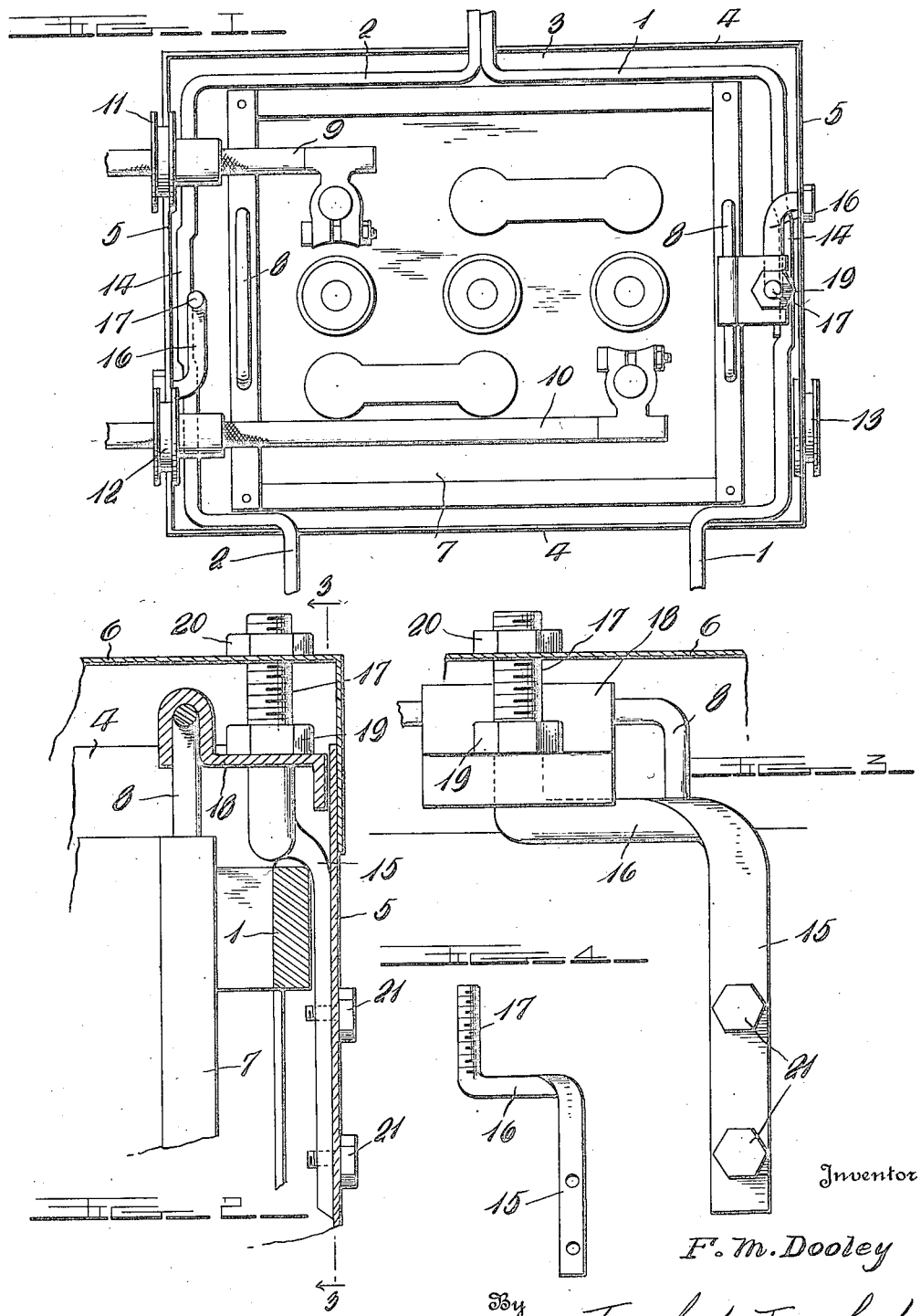
Inventor
F. M. Dooley
By Townshend & Townshend
Attorneys Patented June 12, 1923.

1,458,280

UNITED STATES PATENT OFFICE.

FRANK M. DOOLEY, OF MOBILE, ALABAMA.

BATTERY BOX.

Application filed April 14, 1922. Serial No. 552,745.

*To all whom it may concern:*

Be it known that I, FRANK M. DOOLEY, a citizen of the United States, residing at Mobile, in the county of Mobile and State of Alabama, have invented certain new and useful Improvements in a Battery Box, of which the following is a specification.

My invention relates to battery holding means as applicable to Ford, and other cars of the same general type. The primary object of the invention is the provision of an improved battery box protecting the battery from mud, water and slush thrown up beneath the car.

Another object is the provision of an improved means for securing the box to the battery bracket of the car.

With these, and such other objects in view as will be apparent from the description, my invention resides in the novel construction, combination and arrangement of parts hereinafter described and claimed, and illustrated in the accompanying drawings, of which:

Figure 1 is a top plan view of a box and battery as mounted, with the cover removed, Figure 2 an enlarged vertical section on line 2—2 of Figure 1, Figure 3 a vertical section on line 3—3 of Figure 2, and Figure 4 an elevation of a fastening bolt employed.

In the drawings the usual battery bracket is shown, comprising the side bars 1 and 2 disposed in the usual manner transversely of the car frame. Surrounding the bracket is a box like container 3 having side walls 4, end walls 5, and a cover 6, the upper portions of the walls 4 and 5, and the cover 6 being disposed above the bracket bars 1 and 2.

Seated in the usual manner within the bracket, is a battery 7 equipped with the end handles 8, and the battery leads 9 and 10 are passed through bushings 11 and 12 respectively seated in slots formed in the end walls 5, for this purpose. A blind bushing 13 is provided in one end wall for use in a reverse mounting of the battery. Adjacent the battery handles 8 the side bars 1 and 2 of the bracket are bowed outwardly through a portion of their length, as at 14, for a purpose hereinafter described.

On each end of the container 3 are disposed holding bolts comprising vertical shanks 15 secured to the inner faces of the walls 5 and spaced laterally of the bowed portions 14 of the bracket bars, above which the shanks extend and are bent inwardly and then horizontally, as at 16, to the median line of the battery, from which point they are extended vertically upward terminating in threaded ends 17. This offset construction of the bolts disposes the horizontal portions 16 in hooked relation over the bows 14 of the bracket bars 1 and 2, whereby the container will be supported on the bracket.

The usual battery hold down clamps 18 are engaged over the handles 8 and are secured on the threaded portions 17 of the bolts by means of nuts 19. As a means of securing the cover 6 in position, the threaded ends 17 are extended considerably above the hold down clamps through apertures provided in the cover. Nuts 20 serve to clamp the cover in place.

It will thus be seen that the offset bolts comprise a means for supporting the container, holding down the battery, and securing the cover. The bolt shanks 15 are preferably secured to the walls 5 by means of bolts 21, so that they may readily be applied after the container is in position.

While I have illustrated and described certain details which enter into the construction of the preferred form, I desire it to be understood that I do not intend to limit myself to these, but that any such may be used as will fall within the scope of the invention as claimed.

I claim:—

1. A device of the character described comprising a battery container, a cover therefor, a cover securing member carried by said container, and means on said member adapted to engage a battery in the container.

2. The combination with an automobile battery bracket, of a container, a cover for said container, bracket engaging means carried by the container for support thereof, said means serving as a fastener for the cover.

3. The combination with an automobile battery bracket, of a container, a cover therefor, a bracket engaging member carried by the container for support thereof, and means on said member for holding down a battery in the bracket, said member serving as a fastener for the cover.

4. The combination with an automobile battery bracket, of a container, a cover therefor, an offset bolt carried by the container for engagement over said bracket to support the container, said cover being arranged to receive the bolt therethrough, and a nut threaded on the end of said bolt to secure said cover.

5. The combination with an automobile battery bracket, of a container, a cover therefor, an offset bolt carried by the container for engagement over said bracket to support the container, a battery hold down clamp disposed on said bolt, said cover being apertured to receive one end of the bolt therethrough, and nuts threaded on said bolt to hold said clamp and cover in position.

6. The combination with an automobile battery bracket, of a box container, a vertically disposed bolt secured to a wall of said container and offset to engage over said bracket for support of the container, one end of said bolt being threaded and projecting above the container, battery hold down means carried by the bolt, a cover for said container apertured to receive the bolt therethrough, and a nut threaded on the end of said bolt to secure the cover.

7. The combination with an automobile battery bracket, of a container adapted to surround the bracket, a supporting member carried by said container for engagement with the bracket, a cover, means on said member for securing the cover on said container, and battery hold down means carried by said member within the container.

8. A device of the character described comprising a battery container, a cover therefor, a cover securing member carried by said container, means on said member adapted to engage a battery in the container, said member being formed for supporting engagement with an automobile battery bracket.

In testimony whereof I affix my signature.

FRANK M. DOOLEY.